US007042863B1

(12) United States Patent
Morris

(10) Patent No.: US 7,042,863 B1
(45) Date of Patent: May 9, 2006

(54) EFFICIENT TIME-DIVISION MULTIPLEXED ADDRESSING PROTOCOL

(75) Inventor: Martin Morris, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/524,326

(22) Filed: Mar. 13, 2000

(51) Int. Cl.
H04Q 7/24 (2006.01)
H04Q 7/20 (2006.01)
H04B 7/212 (2006.01)
H04J 3/06 (2006.01)

(52) U.S. Cl. .............. 370/338; 370/442; 370/508; 370/331; 455/436

(58) Field of Classification Search ............ 370/321, 370/324, 326, 336, 337, 345, 346, 347, 348, 370/350, 442, 443, 458, 477, 498, 331, 445, 370/449, 433, 338, 503, 329; 455/41.2; 375/134, 137
See application file for complete search history.

(56) References Cited

U.S. PATENT DOCUMENTS

| 4,405,829 A | 9/1983 | Rivest et al. ............... 178/22.1 |
| 5,490,139 A | 2/1996 | Baker et al. ................. 370/60 |
| 5,572,528 A | 11/1996 | Shuen ............................ 370/85 |
| 5,636,216 A | 6/1997 | Fox et al. .................... 370/402 |
| 5,652,751 A | 7/1997 | Sharony ..................... 370/227 |
| 5,696,903 A | 12/1997 | Mahany |
| 5,699,353 A | 12/1997 | Kent ........................... 370/315 |
| 5,708,655 A | 1/1998 | Toth et al. ................... 370/313 |
| 5,742,593 A | 4/1998 | Dunn et al. ................. 370/393 |
| 5,754,547 A | 5/1998 | Nakazawa .................. 370/401 |
| 5,812,531 A | 9/1998 | Cheung et al. ............. 370/255 |
| 5,825,772 A | 10/1998 | Dobbins et al. ............ 370/396 |
| 5,835,061 A | 11/1998 | Stewart ....................... 342/457 |
| 5,845,081 A | 12/1998 | Rangarajan et al. ........ 395/200 |
| 5,850,592 A | 12/1998 | Ramanathan |
| 5,854,899 A | 12/1998 | Callon et al. ............... 395/200 |
| 5,983,098 A | 11/1999 | Gerszberg et al. .......... 455/426 |
| 6,026,082 A * | 2/2000 | Astrin ........................ 370/336 |

(Continued)

FOREIGN PATENT DOCUMENTS

EP 0695059 A1 1/1996

(Continued)

OTHER PUBLICATIONS

Mattisson, et al., Specification of the Bluetooth System, 8:1-224, Jan. 22, 1999.

(Continued)

Primary Examiner—Hanh Nguyen
(74) Attorney, Agent, or Firm—McAndrews, Held & Malloy, Ltd.

(57) ABSTRACT

A method and apparatus for communicating within a system including a master unit and one or more slave units is disclosed herein. A member address, corresponding to a selected time slot of a plurality of time slots defined by a system clock configured to repeat in cycles, is assigned to a first slave unit. The first slave unit is also assigned a first extended address associated with an occurrence of the designated time slot within at least a selected one of the cycles. After being polled by the master unit during an immediately preceding time slot, the first slave unit transmits information thereto during the designated selected time slot within the selected cycle. A second slave unit may also be assigned the member address and a second extended address associated with a different occurrence of the selected time slot within one or more of the cycles. The second slave unit is disposed to transmit information during such different occurrence of the selected time slot.

18 Claims, 7 Drawing Sheets

U.S. PATENT DOCUMENTS

| | | | | |
|---|---|---|---|---|
| 6,097,707 | A | * | 8/2000 | Hodzic et al. .............. 370/321 |
| 6,198,728 | B1 | * | 3/2001 | Hulyalkar et al. ....... 370/310.1 |
| 6,570,857 | B1 | * | 5/2003 | Haartsen et al. ............ 370/312 |
| 6,590,928 | B1 | * | 7/2003 | Haartsen ..................... 375/134 |
| 6,683,886 | B1 | * | 1/2004 | van der Tuijn et al. ..... 370/458 |
| 6,751,200 | B1 | * | 6/2004 | Larsson et al. ............. 370/255 |
| 2002/0018458 | A1 | * | 2/2002 | Aiello et al. ................ 370/348 |

FOREIGN PATENT DOCUMENTS

| | | |
|---|---|---|
| WO | WO 99/14897 | 3/1999 |
| WO | WO 99 14897 A | 3/1999 |
| WO | WO 99 37106 A | 7/1999 |

OTHER PUBLICATIONS

"PMDF System Manager's Guide PMDF-Ref-5.1," http://www.geneseo.edu/pmdf/sysman/book_1.html#-chapter I (Mar. 16, 1999).

Haartsen, Jasp, "Bluetooth—the universal radio interface for ad hoc, wireless connectivity", Ericsson Review, Se, Ericsson (3) ;110-117, (1998).

Haartsen, Jasp, "Bluetooth-The universal radio Interface for ad hoc, wireless connectivity," *Ericsson Review*, No. 3, pp. 110-117, (1998).

"Specification of the Bluetooth System, Core, Version 1.0B," *Bluetooth SIG Specifications*, pp. 18-42, (Dec. 1, 1999).

Kalia M et al., "Effective Policies For Increasing Capacity In Bluetooth: An Indoor Pico-Cellular Wireless System", VTC 2000 Spring-Spring; 2000 IEEE 51st ; Vehicular Technolgy Conference Proceedings in Tokyo, Japan, May 15-18, 2000, IEEE Vehicular Technology Conference, New York, NY: IEEE, US vol. 2 of 3: pp. 907-911, XP000968001; ISBN: 0-7803-5719-1.

* cited by examiner

FIG. 5

* = Available for other uses, e.g. broadcast or paging

EFFICIENT TIME-DIVISION MULTIPLEXED ADDRESSING PROTOCOL

FIELD OF THE INVENTION

The present invention generally pertains to wireless networks, and more particularly to methods for polling and otherwise addressing devices in such networks.

BACKGROUND OF THE INVENTION

Computer networks allow multiple computers, peripherals and other information storage, retrieval or processing devices to share data. Each device attached to a network is typically referred to as a node on the network, or a node that is part of the network. Local Area Networks ("LANs") have historically consisted of nodes interconnected by physical telecommunications media (eg, coaxial cable, twisted pair wire, or fiber optics). Recently wireless LANs, the nodes of which are not connected by means of a physical medium, have started to appear in the market. These wireless LANs communicate by means of infra-red (IR), radio or other signals. One of the benefits of using wireless LANs is that cabling is not required. This is a particularly useful feature for mobile nodes such as laptop and notebook computers, PDAs (personal digital assistants), and the like. If appropriately equipped with an appropriate wireless adapter, the mobile nodes can move around within a predefined coverage area and remain connected to the network.

Certain wireless LANs are implemented similarly to cellular telephone networks. In such implementations the wireless mobile nodes of the LAN do not communicate directly with each other, but rather send all signals to a central base station for redirection to a destination node. A similar arrangement is contemplated for the proposed "Bluetooth" wireless communications protocol. This protocol is predicated on the grouping of physically proximate wireless nodes into "piconets", and is described in *Specification of the Bluetooth System*, v0.8, Jan. 22, 1999 (and in subsequent revisions thereof).

In the Bluetooth system each piconet includes a master unit and at least one slave unit. The Bluetooth protocol specifies a time-division duplex communication scheme in which each slave unit is polled by the master unit immediately prior to transmitting information. Once polled, the addressed slave unit transmits during the next time slot. Since each time slot is specified to be 625 microseconds in length, no members of the piconet other than the master unit and the addressed slave unit are able to transmit during the 1,250 microsecond duration of this exchange. The Bluetooth protocol currently allows for 7 active slave units within a given piconet, with each slave unit being given the opportunity to transmit information on average every 14 slots. Since a single slot may contain up to 18 user data bytes, each slave unit may transmit at up to 16 kb/second. Unfortunately, if all slave units require less than this amount of bandwidth, the difference is wasted unless additional slave units are "parked" and "unparked" pursuant to the Bluetooth protocol. However, a significant amount of overhead is associated with this "parking" mechanism, and its use may result in potentially long idle periods preceding transmission from newly "unparked" slave units.

Accordingly, it would be desirable to enable relatively larger numbers of slave units to simultaneously participate in Bluetooth and other networks in a manner avoiding the inefficiencies described above.

SUMMARY OF THE INVENTION

Briefly, therefore, this invention provides for a method and apparatus for communicating within a system including a master unit and one or more slave units. A member address, corresponding to a selected time slot of a plurality of time slots defined by a system clock configured to repeat in cycles, is assigned to a first slave unit. The first slave unit is also assigned a first extended address associated with an occurrence of the designated time slot within at least a selected one of the cycles. After being polled by the master unit during an immediately preceding time slot, the first slave unit transmits information thereto during the designated selected time slot within the selected cycle. A second slave unit may also be assigned the member address and a second extended address associated with a different occurrence of the selected time slot within one or more of the cycles. The second slave unit is disposed to transmit information during such different occurrence of the selected time slot.

BRIEF DESCRIPTION OF THE DRAWINGS

In the accompanying drawings:

FIG. 5 is a timing diagram illustrating an exemplary poll/response cycle between a master node and a plurality of slave nodes identified utilizing the extended addressing scheme of the present invention.

DETAILED DESCRIPTION OF THE INVENTION

The present invention is more fully described with reference to FIGS. 1–7. An exemplary implementation of the invention is discussed and illustrated with reference to its implementation using wireless networks predicated on the proposed "Bluetooth" wireless communications protocol. This protocol contemplates the grouping of physically proximate wireless nodes into "piconets", and is described in *Specification of the Bluetooth System*, v0.8, Jan. 22, 1999 (and in subsequent revisions thereof).

Figure 1:
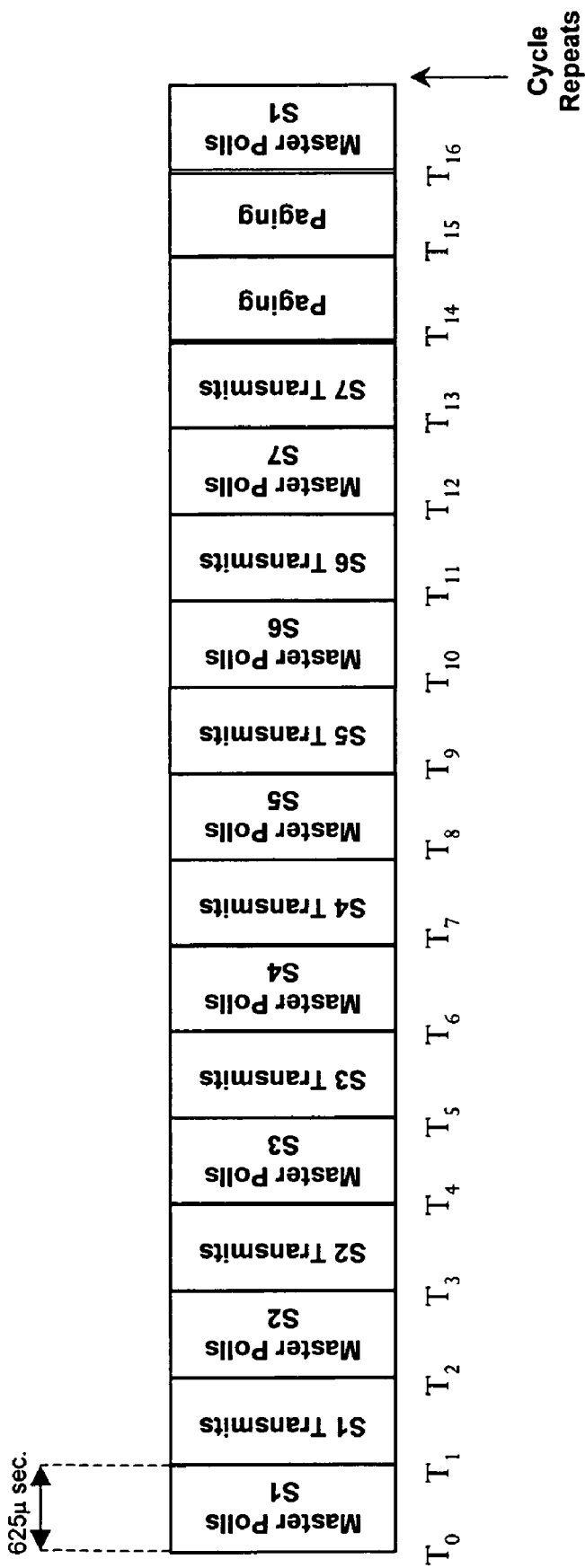
FIG. 1 illustrates the timing conventionally characterizing communication among individual nodes within a piconet in accordance with the Bluetooth standard.

FIG. 1 illustrates an example of the timing conventionally characterizing communication among individual nodes within a piconet in accordance with the Bluetooth standard. As can been seen in FIG. 1, a master node engages in a series of transmissions whereby it may sequentially poll the individual slave units in the piconet. It should be understood that the master node is free to poll slave units in any sequence and at any frequency deemed appropriate. The example of FIG. 1 has been selected as being illustrative of a polling sequence designed to equitably apportion available bandwidth among all slave units, while simultaneously maximizing the throughput for each such slave unit. Referring again to FIG. 1, each time slot is 625 microseconds in duration, and may contain a total of 18 data bytes. Given that the Bluetooth protocol allows seven slaves to transmit in succession, a given slave will have an opportunity to transmit every 14 slots, or every 14* 625 microseconds. This represents a data rate of 16.45 kb/sec.

At time $T_0$ in FIG. 1, the master node polls a first slave node within the piconet ("Slave 1"). Slave 1 responds to the poll of the master node at time $T_1$. During the 1250 microseconds of this exchange, no other unit within the piconet may transmit information. Since the Bluetooth protocol only allows seven active slaves in a network at any given time, the communication illustrated by FIG. 1 is representative of that occurring within a conventional Bluetooth network having reached maximum occupancy. In accordance with one aspect of the present invention, this inherent limitation is overcome by assigning more than one slave node to a particular active member address (i.e., "AM_ADDR" of the Bluetooth protocol).

Figure 2:
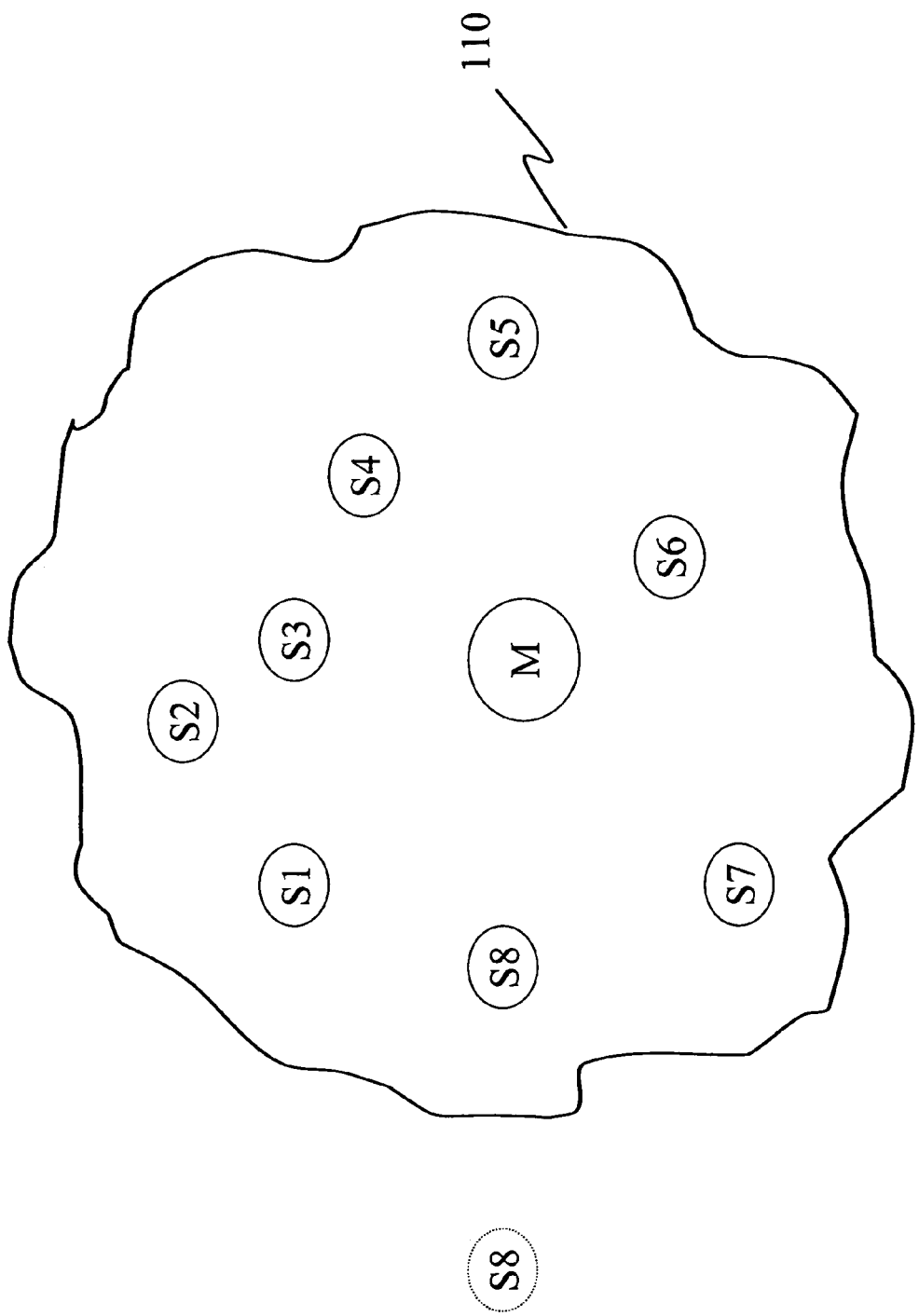
FIG. 2 shows a piconet containing a master node and a plurality of slave nodes.

FIG. 2 shows a piconet 310 containing a master node "M" and seven slave nodes, S1–S7, which is the maximum allowable number of slave nodes permitted to simultaneously participate in a piconet under the Bluetooth protocol. Each of the slave nodes, S1–S7 is assumed to have been assigned a unique AM_ADDR upon joining the piconet 310. Node S8 is initially assumed not to be a member of the piconet 310, and in this state is illustrated using a dashed border. As is described below, the master node "M" is operative to assign an AM_ADDR to node S8 in a manner which allows all eight slave nodes, S1–S8, to participate in the piconet 310.

Figure 3:
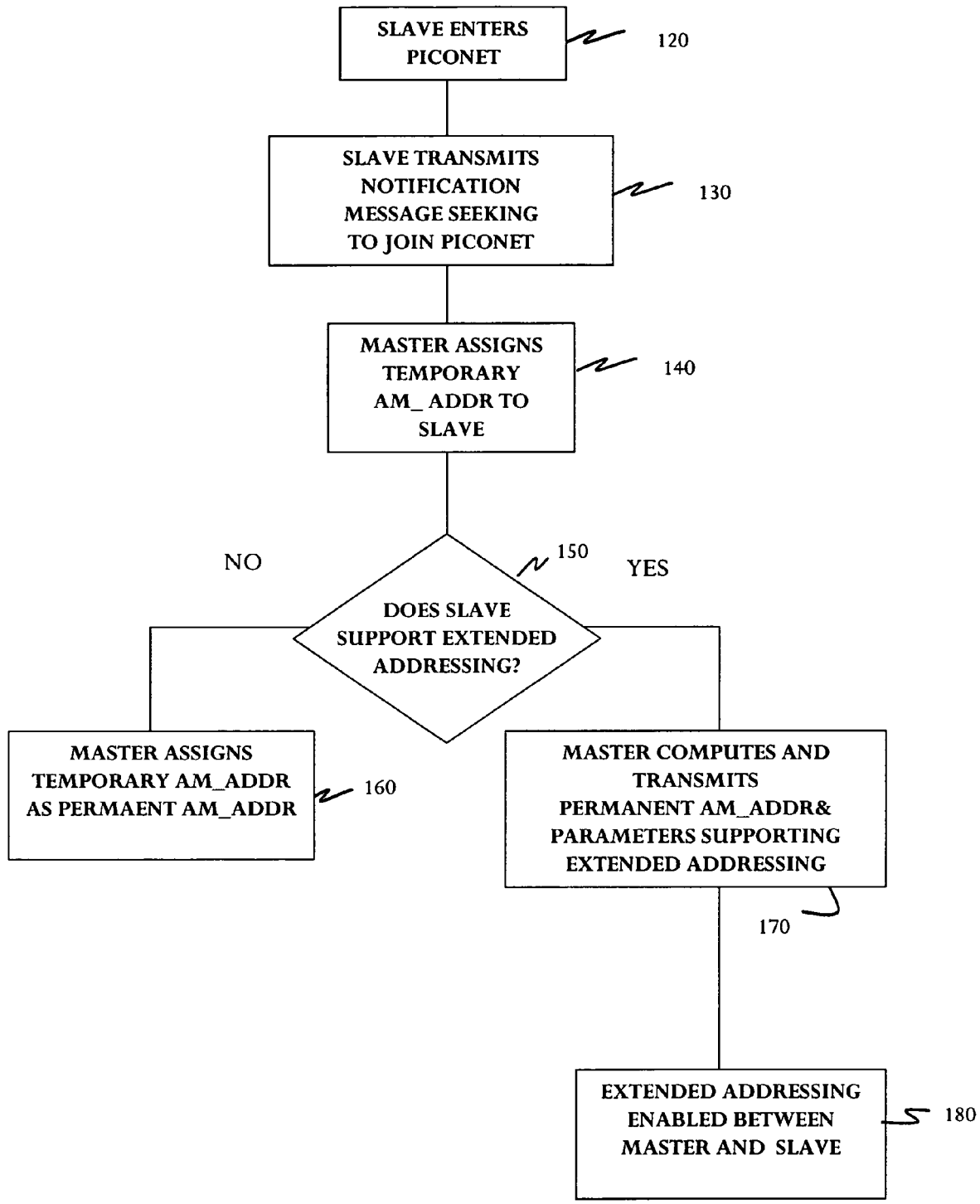
FIG. 3 is a flow chart depicting the steps associated with the joining of an eighth slave node to the piconet of FIG. 2 through an extended addressing scheme of the present invention.

FIG. 3 is a flow chart depicting the steps associated with the joining of node S8 to the piconet 110. When S8 comes within the transmission range of the nodes operating within the piconet 110 and determines it is operational (step 120), node S8 transmits a notification message (step 130) indicating its desire to join the piconet 110. If all of the available AM_ADDRs are being used by nodes in the piconet 110, the master node M would not respond to S8's request to join the piconet 110. If available AM_ADDR's exist, the master node M receives this transmission from node S8 and assigns a temporary AM_ADDR to node S8 (step 140). This temporary AM_ADDR is subsequently replaced by a permanent address, as described more fully below. In a preferred implementation of the invention, certain pairs of the slave nodes S1–S7 are assigned the same AM_ADDR but are also assigned different address extensions as well. As is described below, such extended addressing enables more than a single slave node to utilize a given AM_ADDR.

Referring again to FIG. 3, in step 150 the master node M inquires as to whether node S8 supports the extended addressing format contemplated by the present invention. If node S8 does not support such extended addressing, the master node M assigns the originally chosen temporary AM_ADDR to node S8 (step 160). If, on the other hand, node S8 indicates that it is capable of supporting extended addressing, the master node M performs a series of calculations (described below with reference to FIG. 4) to determine if it will be feasible to permit node S8 to share an AM_ADDR with another slave node (step 170). If the master node M determines that node S8 may join the piconet 110, it becomes a slave node and is assigned an AM_ADDR as well as an address extension (collectively, an "extended AM_ADDR") uniquely distinguishing it from other slaves within the piconet 110 (step 180).

Figure 4:
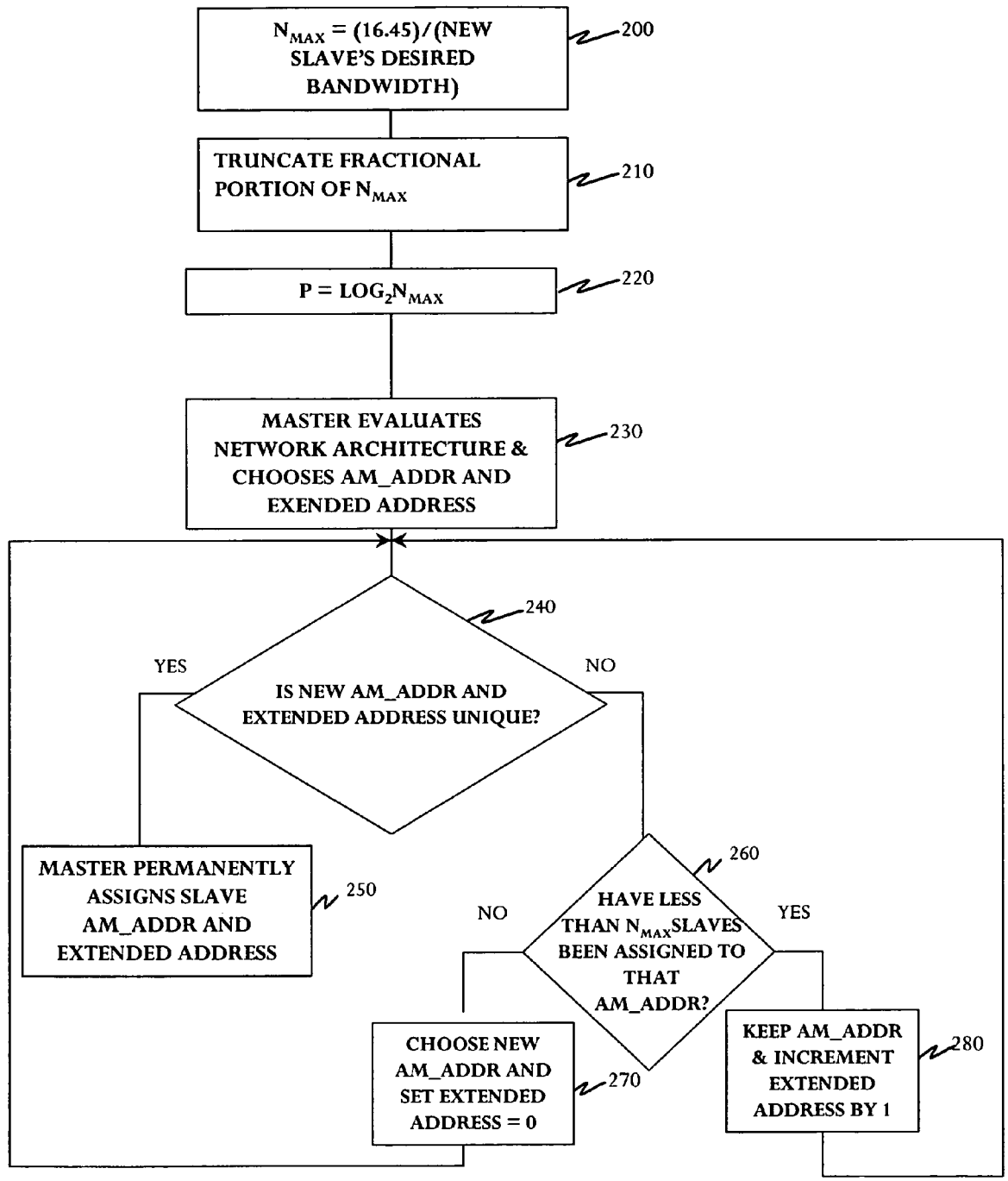
FIG. 4 illustratively represents the manner in which extended addresses applicable to slave nodes may be calculated in accordance with the invention.

FIG. 4 is a flowchart representation of the sequence of calculations effected by the master node M in determining whether it will be feasible for node S8 to join piconet 110 using extended addressing. For illustrative purposes, the calculations depicted in FIG. 4 are premised on the existence of the seven (7) slave nodes initially operational within a piconet 110 with an eighth node seeking entry therein. However, it should be understood that the invention disclosed herein is not limited to using a particular number of slave nodes in combination with a single master node to form a piconet. Once the sequence of calculations described with reference to FIG. 4 have been completed, extended addressing information is transmitted to node S8 so as to enable its joining of the piconet 110.

In the example of FIG. 4, it is assumed that node S8 requires 4 kb/second of bandwidth and that this is specified in the piconet in the message transmitted by node S8 requesting entry into the piconet 110. Accordingly, in a first calculation the master node M divides the Bluetooth data rate (16.45 kb/second) by the amount of reserved bandwidth (4 kb/second) requested by the slave S8 (step 200). The resulting quotient provides a value for the variable "$N_{max}$", which represents the maximum number of slaves of a given bandwidth capable of being assigned a common AM_ADDR. In the preferred embodiment $N_{max}$ cannot exceed 256, which corresponds to a data rate of 64 bits/second with a maximum latency of 2.25 seconds. In the present example, 16.45 kb/second is divided by the data rate requested by node S8 (4 kb/second) to yield a value of $N_{max}=4.1125$. Because a fractional portion of a slave node may not be assigned to a particular address, in step 210 the value of $N_{max}$ is truncated to the next lowest whole number (i.e., to 4).

In step 220, the master node M determines the largest power, "P," of two which is less than or equal to $N_{max}$. The operation of step 220 can be expressed as $P=\text{Log}_2 N_{max}$ in mathematical terms, and results in a value of "P=2" in the present example. As is described below, the value of P will eventually be used as a bit counter and is therefore also truncated to the next lowest whole number.

After having determined the values of the parameters $N_{max}$ and P associated with the node S8, the master node M evaluates the address assignments of the slaves S1–S7 initially within the piconet 110. In a preferred implementation the master node M maintains a look-up table containing the AM_ADDR of each slave operating within the piconet 110. Table III provides an example of the type of information that may be maintained by the master node M in such a look-up table along with the AM_ADDR of each participating slave node. In what follows it is assumed that the nodes S1–S8 have the addresses and bandwidths indicated in Table III.

TABLE III

Parameters for Slave Nodes Depicted in FIG. 2

| Slave No. | Bandwidth | AM_ADDR | Support Extended Addressing? | Extended Address |
|---|---|---|---|---|
| S1 | 8 kb/sec. | 1 | Yes | 0 |
| S2 | 4 kb/sec. | 2 | Yes | 0 |
| S3 | | 3 | No | N/A |

TABLE III-continued

Parameters for Slave Nodes Depicted in FIG. 2

| Slave No. | Bandwidth | AM_ADDR | Support Extended Addressing? | Extended Address |
|---|---|---|---|---|
| S4 | | 4 | No | N/A |
| S5 | | 5 | No | N/A |
| S6 | | 6 | No | N/A |
| S7 | 4 kb/sec. | 2 | Yes | 1 |
| S8 | 4 kb/sec. | TBD | Yes | TBD |

Based upon the information in Table III, the master node M determines that both AM_ADDR=1 and AM_ADDR=2 are currently being utilized for extended addressing (step 230). Based upon this information the master node M concludes that network efficiency can be enhanced if one of these two addresses is assigned to node S8, since excess unused bandwidth is associated with each. The master node then executes a routine to determine which extended AM_ADDR should be assigned to the new slave node S8.

As a first step in this routine, the master node M evaluates the bandwidth characteristics of the slave nodes associated with the addresses AM_ADDR=1 and AM_ADDR=2. As is evident from Table III, AM_ADDR=1 supports a single slave node S1, which requires 8 kb/second of bandwidth. In contrast, AM_ADDR=2 supports both slave nodes S2 and S7, which each 4 kb/second of bandwidth. In view of the bandwidth requirements of node S8 (i.e., 4 kb/second), the master node M determines that available bandwidth can be used most efficiently by assigning an AM_ADDR to node S8 which has previously been assigned to slave nodes having the same bandwidth requirements as node S8. Accordingly, the master node M tentatively assigns AM_ADDR=2 to node S8. This assignment is kept tentative until the master definitively determines whether AM_ADDR=2 is capable of supporting node S8.

It is observed that the master node M could also have tentatively assigned AM_ADDR=1 to node S8. However, this would have resulted in a less efficient assignment since AM_ADDR=1 is configured to receive data packets at 8 kb/second intervals. This is because if AM_ADDR=1 were assigned to node S8, data transmissions to that address would be at a rate of 8 kb/second regardless of whether such transmissions were intended for slave node S1 or node S8. It follows that assigning AM_ADDR=1 to node S8 would result in a loss of 4 kb/second during data transmission to node S8, since node S8 only requires a bandwidth of 4 kb/second.

Upon determining that AM_ADDR=2 is potentially the most efficient address for node S8, the master node M determines whether less than $N_{max}$, slave nodes have been assigned to AM_ADDR=2. Inspection of Table III makes clear that only two slave nodes, i.e., slave nodes S1 and S7, have been previously associated with AM_ADDR=2. It follows that assigning AM_ADDR=2 to node S8 would result in three slave nodes sharing AM_ADDR=2. Since three is less than the maximum number of slaves permitted to share AM_ADDR=2 (i.e., $N_{max}$=4 for node S8), master node M determines that AM_ADDR=2 may be assigned to node S8. Next, the master node M selects a particular address extension to be assigned to node S8. In a preferred implementation address extensions are assigned sequentially, and in such case node S8 would be assigned an address extension of "2" since address extensions "0" and "1" had been previously assigned to slave nodes S2 and S7, respectively.

Before assigning a specific extended AM_ADDR to node S8, the master node M verifies that another slave node has not already been assigned the specific extended AM_ADDR. Once the master node M verifies that the extended AM_ADDR has not been assigned, it transmits the extended AM_ADDR and the "P" value calculated above to node S8 (step 250). If the extended AM_ADDR of interest had already been in use by another slave node in the piconet 110, the master node M determines if sufficient bandwidth remains associated with the selected AM_ADDR to accommodate node S8. This requires the master node M to ascertain whether the maximum number of slave nodes, $N_{max}$, have been assigned to the AM_ADDR (step 260). If less than $N_{max}$ slaves are assigned to the AM_ADDR of interest, then the master node M increments the address extension by one and retains the AM_ADDR initially chosen (i.e., to AM_ADDR=2). In the present example this would result in selection of AM_ADDR=2, address extension=3. In the general case the master node M would continue incrementing the address extension of the desired AM_ADDR until a unique extended AM_ADDR is identified or until the address extension reaches $N_{max}$, whichever occurs first. For instance, if in the present example the maximum number of slaves supportable at the 16.45 kb/second data rate contemplated by the Bluetooth specification were already assigned to AM_ADDR=2 already contained, then the master node M would choose a different AM_ADDR (step 270). If the master node M needs to choose a new AM_ADDR, it initially selects an address extension of "0" to accompany this new AM_ADDR. The master node M then determines whether this new extended AM_ADDR is unique (step 240). In the event that it is not unique, the master node M increments the address extension as described previously until a unique extended AM_ADDR is attained (step 280). In the present example, the master node M would have proceeded as follows to identify an appropriate extended AM_ADDR for assignment to node S8 if assignment of AM_ADDR=2 thereto had been infeasible:

(1) tentatively select an extended address comprised of AM_ADDR=1, address extension=0;

(2) determine that the tentatively selected extended AM_ADDR identified in (1) is in use;

(3) increment the address extension in (1) by one unit; and, (4) permanently assign the extended address of AM_ADDR=1, address extension=1 to node S8.

Figure 5:
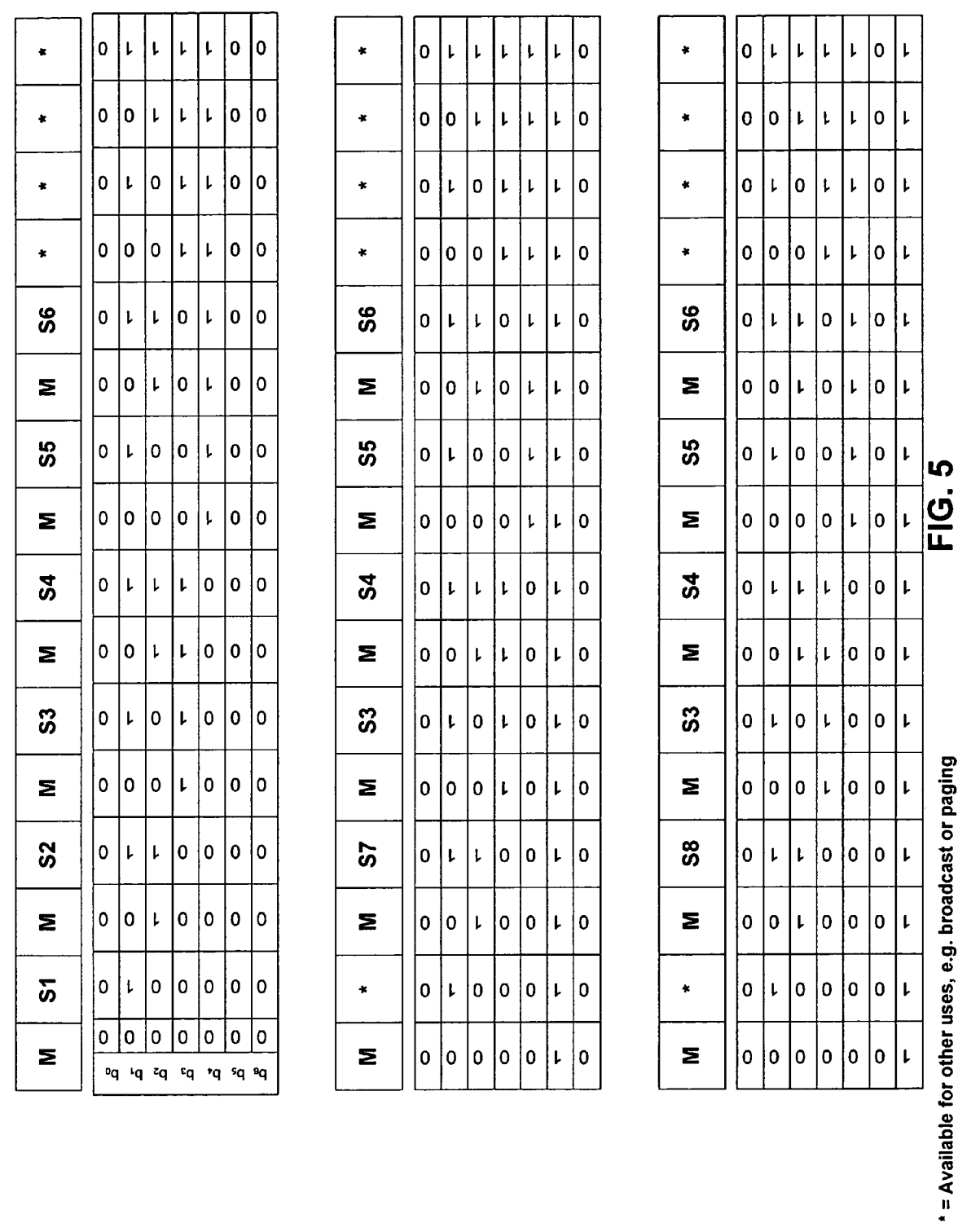

FIG. 5 illustratively represents the sequence in which the master node M and each of the slave nodes S1–S8 are disposed to transmit information during a corresponding sequence of poll/response time slots defined by a Bluetooth system clock. In the exemplary embodiment the Bluetooth system clock is synchronized between master node M and each slave node S1–S8 whenever a connection is established therebetween. In a preferred embodiment certain bits of the Bluetooth system clock are used to uniquely define the poll/response system time slots corresponding to each of the AM_ADDR addresses being used within a piconet. Although the Bluetooth protocol contemplates a 22-bit system clock, only 7 bits of this system clock are depicted in FIG. 5.

Since the present invention enables more than a single slave node to utilize a given AM_ADDR, the master node M must have some means of indicating which slave it is intending to poll when transmitting to an AM_ADDR containing multiple slaves. As was described above, the master node M calculates the maximum number of slaves, $N_{max}$, capable of sharing a particular AM_ADDR. The master node M also determines a value of "P" associated with an AM_ADDR having multiple slave nodes by using the equation $P=Log_2 N_{max}$. This "P" value represents the number of bits necessary to uniquely differentiate between the different extended addresses of the slave nodes occupying a common AM_ADDR.

Referring to FIG. 5, bit 1 of the Bluetooth system clock is "0" when the master node is transmitting and "1" when a slave node is transmitting. Bit "0" of the Bluetooth system clock is reserved for counting "half-slots", and is not considered throughout the poll/response cycles depicted in FIG. 5 (only full slots are utilized in the exemplary implementation). Bits 2 and higher increment with successive poll/response slot pairs, and repeat with each cycle of the Bluetooth system clock.

The Bluetooth master is free to poll devices in any order it chooses. In accordance with the invention, the master node selects a parameter "Q" such that $2^Q$ is greater than or equal to the number of polls required to complete one cycle through all the slave nodes. In a preferred implementation, "Q" would equal 3, since $2^3=8$ is greater than 7, which is the number of polls required to poll all possible AM_ADDRs. A complete cycle of Bluetooth clock bits 2 through 2+Q−1 (in a preferred implementation, bits 2 through 4) will therefore represent one polling cycle of the master node. The next sequential bits of the Bluetooth system clock (i.e., bits Q through Q+P or bits 5 and 6) may be used to indicate which extended address is being polled.

In a preferred implementation, the poll/response sequence is directed to those slaves having an extended address of "1" when bits 6 and 5 of the Bluetooth system clock are "0" and "1", respectively. The second row in FIG. 5 represents the poll/response sequence intended to reach those slave having an extended address of 1. As can be seen in FIG. 5, bits 6 and 5 are of value "01" throughout this entire poll/response sequence. Similarly, the state "10" for bits 6 and 5 of the Bluetooth system clock is reserved for indicating when the poll/response cycle is intended for those slaves whose extended address equals 2. The third row in FIG. 5 shows the poll/response cycle for those slaves with an extended address of 2. Those slave nodes who do not share a common AM_ADDR with another slave node are typically polled each poll/response cycle. For example, S3, which according to Table III does not support extended addressing, is polled during each poll/response cycle, even though those cycles may otherwise be designed to reach individual slaves sharing a common AM_ADDR.

Each slave node can be made aware of the length of the poll/response cycle by transmitting the value of parameter "Q" contemporaneously with the AM_ADDR, extended address, and parameter "P". Slave nodes can use this information to reduce power consumption by "sleeping" until just prior to being polled. Since in the preferred embodiment the master node M and all slave nodes S1–S8 are synchronized to the Bluetooth system clock, a given slave node need be "awake" to monitor transmissions from the master only during its assigned time slot. For example, the slave node S3 can determine that an interval of 10 milliseconds ($2^Q=8$ addresses*1250 microseconds/address) will exist between each of its poll/response interactions with the master node M. Based on this information, S3 may enter into a "sleep" mode during each of these intervals of 10 milliseconds and then "wake up" just prior to its next poll/response interaction with the master node M.

Figure 6:
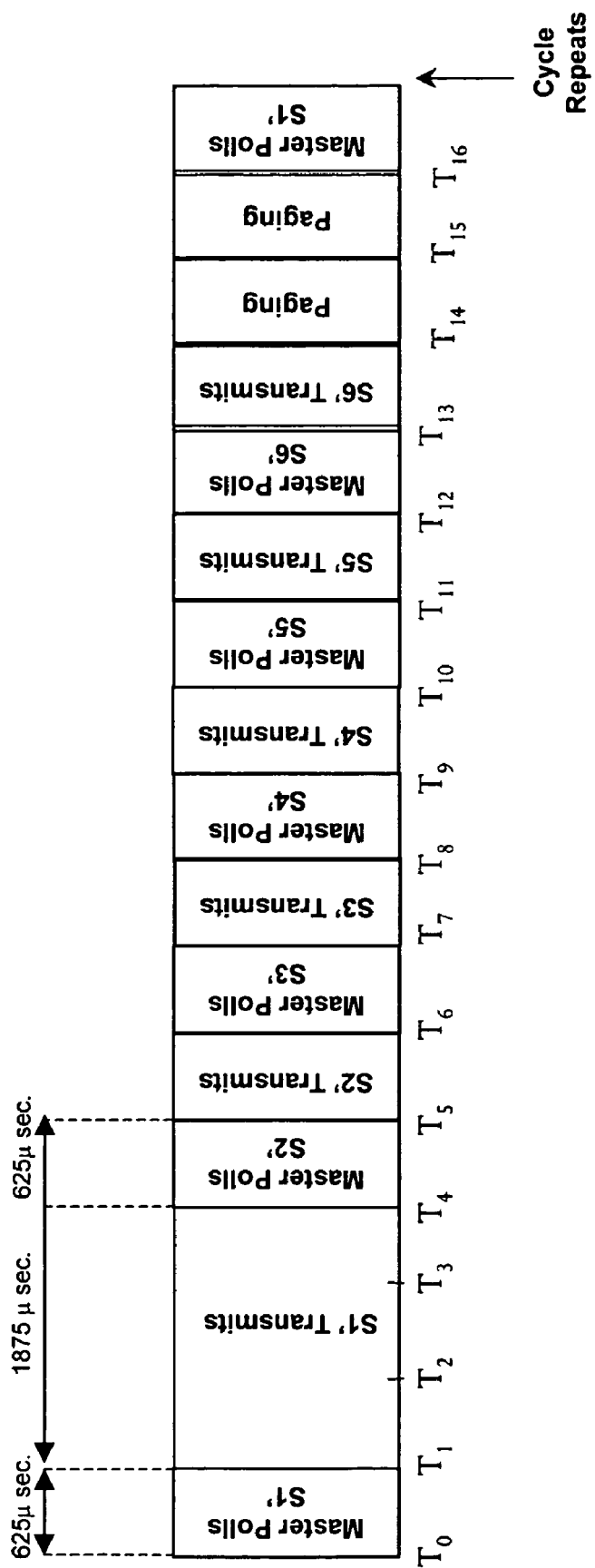
FIG. 6 is a timing diagram illustrating an exemplary poll/response cycle within a piconet containing a master node, a high-bandwidth slave node allocated multiple time slots, and a plurality of lower-bandwidth slave nodes.

In an alternate embodiment, the claimed invention can simultaneously accommodate relatively low-bandwidth slave nodes and larger-bandwidth slave nodes within a single piconet. As is described below, this is effected by allocating multiple time slots to higher-bandwidth slave nodes and by utilizing an inventive address extension scheme in communication with lower-bandwidth slave nodes. The Bluetooth specification facilitates communication with higher bandwidth devices by allowing data transmission via data packets spanning either three or five time slots. As an example, a timing diagram for a piconet containing a high-bandwidth node S1' allocated three time slots is depicted in FIG. 6. At time $T_0$ in FIG. 6, the master node M polls node S1' and node S1' responds to such poll between time $T_1$ and time $T_4$ (i.e., for 1875 microseconds). In the manner described above for a piconet containing exclusively low-bandwidth nodes, the master node M polls node S2 and node S1' concludes its transmission at time $T_4$. The master node M then proceeds to poll other low-bandwidth nodes until all nodes within the piconet have been polled and have responded. Since node S1' has been allocated more than a single time slot, it would conventionally be necessary to extend the piconet's cycle in order to allow more than five other slave nodes to participate. However, such lengthening of the piconet's cycle would proportionately reduce the bandwidth available to all participating nodes and render the piconet of FIG. 6 unable to support more than six other slave nodes. It is a feature of the extended addressing scheme of the present invention that such cycle length may be maintained in the piconet of FIG. 6 while allowing participation of more than six other nodes.

Figure 7:
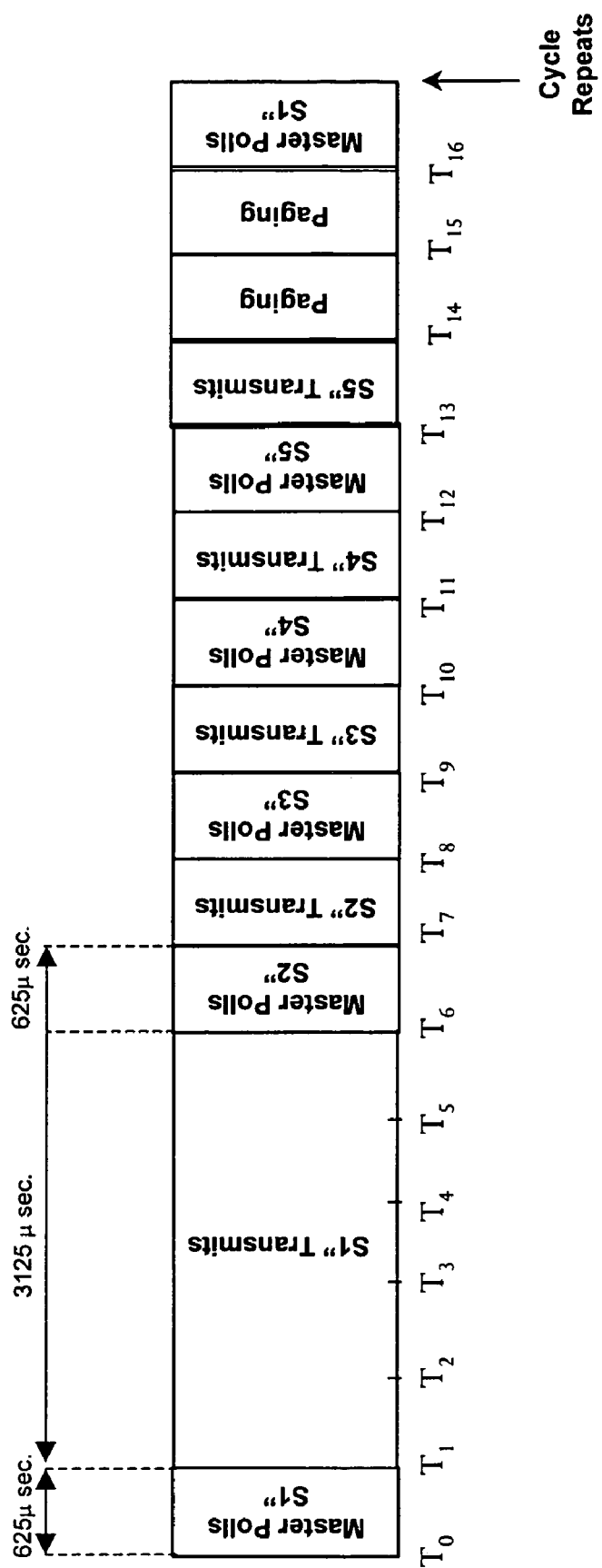
FIG. 7 is a timing diagram illustrating an exemplary poll/response cycle within a piconet containing a master node, a high-bandwidth slave node allocated five time slots, and a plurality of lower-bandwidth slave nodes.

FIG. 7 shows a timing diagram representative of a piconet containing a high-bandwidth node S1" and a plurality of low-bandwidth nodes. However, in the piconet represented by FIG. 7 the high bandwidth node S1" is allocated five time slots (i.e., 3125 microseconds). Since node S1" has been allocated five time slots, the piconet represented by FIG. 7 has available only five other time slots for accommodating other slave nodes without lengthening the piconet's cycle. Again, the above-described extended addressing scheme may be invoked to enable more than five slave nodes to utilize these time slots.

Should the master node, for reasons outside of the scope of the present invention, desire to increase the cycle length, then the parameter "Q" may be increased. In such event the bits of the Bluetooth system clock used for extended addressing will shift accordingly, and the bandwidth per extended AM_ADDR will proportionately decrease (which is taken into account in the computation of "P").

Although the above application has been described primarily with reference to specific embodiments, one skilled in the art can readily appreciate that the teachings of the present invention may be applied in other communication contexts. Thus the application is meant only to be limited by the scope of the appended claims.

What is claimed is:

1. A method for communicating within a system including a master unit and one or more slave units, said method comprising the steps of:

assigning a member address of a Bluetooth protocol to a first slave unit, said member address corresponding to a selected time slot of a plurality of time slots defined by a system clock, said time slots repeating in cycles;

assigning to said first slave unit a first extended address associated with an occurrence of said selected time slot within at least a selected one of said cycles;

transmitting information from said first slave unit to said master unit during said occurrence of said selected time slot:

assigning to a second slave unit said member address and a second extended address associated with a different occurrence of said selected time slot within one or more of said cycles, said second slave unit being disposed to transmit information during said different occurrence of said selected time slot: and determining whether less than a maximum permitted number of said slave units have been assigned to said member address, said maximum permitted number of slave units being determined by performing a division operation in which a bandwidth associated with said member address is divided by a bandwidth allocated to said first slave unit, said maximum permitted number of slave units being no greater than a quotient of said division operation.

2. The method of claim 1 further including the step of polling said first slave unit during one of said plurality of time slots immediately preceding said occurrence of said selected Time slot.

3. The method of claim 2 further including the step of polling a second slave unit during one of said plurality of time slots immediately preceding said different occurrence of said selected time slot.

4. The method of claim 1 further including the step of synchronizing said master unit, said first slave unit and a second slave unit to said system clock, said first extended address and a second extended address corresponding to first and second states of said system clock.

5. The method of claim 1 further including the step of assigning a second member address to a second slave unit, said second member address corresponding to a different selected time slot of said plurality of time slots, said second slave being disposed to transmit information during each occurrence of said different selected time slot.

6. The method of claim 5 further including the step of assigning, to a third slave unit, said first member address and a second extended address associated with a different occurrence of said selected time slot within one or more of said cycles, said third slave unit being disposed to transmit information during said different occurrence of said selected time slot.

7. The method of claim 5 further including the step of polling said first slave unit during one of said plurality of time slots immediately preceding said occurrence of said selected time slot, and polling said second slave unit during the one of said plurality of time slots immediately preceding said different selected time slot.

8. The method according to claim 1, wherein at least two of said slave units transmit a message in different time slots of said plurality of time slots.

9. The method according to claim 1, wherein said plurality of time slots are assigned in a particular cycle of said cycles to effect a time-division multiplexed (TDM) addressing protocol.

10. The method according to claim 9, wherein a particular time slot of said plurality of time slots is used by at least two slave units of said one or more slave units during different cycles of said cycles.

11. The method according to claim 1, wherein said member address comprises an AM_ADDR address of said Bluetooth protocol.

12. A method for communicating within a system including a master unit and one or more slave units, said method comprising the steps of:

assigning a member address of a Bluetooth protocol to a first slave unit, said member address corresponding to a selected time slot of a plurality of time slots defined by a system clock, said time slots repeating in cycles;

assigning to said first slave unit a first extended address associated with an occurrence of said selected time slot within at least a selected one of said cycles: and transmitting information from said first slave unit to said master unit during said occurrence of said selected time slot, wherein said step of assigning a member address includes the step of determining whether a bandwidth associated with extended addresses corresponding to said member address is no less than a desired bandwidth of said first slave unit.

13. A communication system in which a sequence of time slots repeats in cycles, said communication system comprising:

a first slave unit; and a master unit, said master unit including:

means for assigning a member address of a Bluetooth protocol to said first slave unit, said member address corresponding to a selected one of said sequence of time slot;

means for assigning to said first slave unit a first extended address associated with an occurrence of said selected one of said sequence of time slots within one or more of said cycles, said first slave unit being disposed to transmit information during said occurrence of said selected one of said sequence of time slots, wherein said means for assigning a member address comprises means for determining whether a bandwidth associated with extended addresses corresponding to said member address is no less than a desired bandwidth of said first slave unit.

14. The communication system of claim 13 further including a second slave unit; said master unit including means for assigning to said second slave unit said member address and a second extended address associated with a different occurrence of said selected one of said sequence of time slots within one or more of said cycles, said second slave unit being disposed to transmit information during said different occurrence of said selected one of said sequence of time slots.

15. The communication system of claim 13 further including a second slave unit, said master unit including means for assigning a second member address to said second slave unit, said second member address corresponding to a different selected time slot of said sequence of time slots, said second slave unit being disposed to Transmit information during each occurrence of said different selected time slot.

16. In a communication system in which a master unit communicates with one or more slave units during a sequence of time slots repeating in cycles, said master unit comprising:

means for polling a first slave unit;

means for assigning a member address of a Bluetooth protocol to said first slave unit, said member address corresponding to a selected one of said sequence of time slots; and means For assigning to said first slave unit a first extended address associated with an occurrence of said selected one of said sequence of time slots within one or more of said cycles, said first slave unit being disposed to transmit information during said occurrence of said selected one of said sequence of time slots, wherein said means for assigning a member address comprises means for determining whether a bandwidth associated with extended addresses corresponding to said member address is no less than a desired bandwidth of said first slave unit.

17. The master unit of claim 16 further including means for assigning to a second slave unit said member address and a second extended address associated with a different occurrence of said selected one of said sequence of time slots within one or more of said cycles wherein said second slave unit is disposed to transmit information during each occurrence of said selected one of said sequence of time slots.

18. The master unit of claim 16 further including means for assigning a second member address to a second slave unit, said second member address corresponding to a different selected time slot of said sequence of time slots wherein said second slave unit is disposed to transmit information during each occurrence of sad different selected time slot.

* * * * *